July 1, 1958  C. E. PALMER  2,841,361
VALVE
Filed Jan. 23, 1953

Inventor
CHARLES E. PALMER
By Charles L. Lovercheck
Attorney

United States Patent Office 2,841,361
Patented July 1, 1958

2,841,361

VALVE

Charles E. Palmer, Fairview, Pa.

Application January 23, 1953, Serial No. 332,935

4 Claims. (Cl. 251—169)

This invention relates generally to gate valves and more particularly to opposed gate valves and novel gate valve operating mechanisms therefor. This application is a continuation in part of my application, Serial No. 1,524, filed January 10, 1948, which issued as Patent No. 2,626,774.

No particular problem is encountered in the opening of the valve member on the high pressure side of a straight flow valve with opposed double faced expanding stop or gate valve members connected by toggle joints or linkages but considerable friction is set up between the low pressure seat in the valve and the low pressure valve disk on the opening thereof, thereby causing excessive wear on the valve seat and the valve disk, resulting in leakage and frequent replacement and repair of parts. It has been found that there is a certain amount of lateral sliding movement between the low pressure valve disk and the lower pressure seat before the low pressure valve disk opens on the opening of the valve, resulting in excessive wear of parts and difficult operation. There is also a tendency of the high pressure valve disk to open a greater amount than the low pressure valve disk, thereby further increasing the difficulty in opening the low pressure valve disk because of the pressure of the fluid thereon. No means has heretofore been provided to take up the shock caused by the opening of the valve disk which results in all of the pressure being directed toward the low pressure valve disk, causing considerable friction between the disk and its seat. Attempts have been made to use flat guiding rollers to guide the vertical movement of the opposed valve disks and linkages when they are raised in the valve body but no provision has been provided for taking the side thrust and the end thrust of the shafts upon which the rollers are mounted and which carry the links and engaging valve disks. Toggle links heretofore used have been found inadequate in that the valve disks were imperfectly seated on the valve seats, causing excessive wear at particular points in the valve disks and seats, thereby causing leakage and inefficiency.

It is, accordingly, an object of my invention to overcome the above and other defects in valves having oppositely disposed valve disks and operating mechanisms therefor and it is more particularly an object of my invention to provide such a valve and operating mechanism therefor which is simple in construction, economical in cost, efficient in operation, economical in manufacture, and easy to operate.

Another object of my invention is to provide a valve operating mechanism for opposed valve disks in a gate valve which will move opposing gates from their seats simultaneously while frictions resulting from the application of line pressure on one of the valve disks are transferred to tapered rollers mounted upon operating yokes and guided vertically in guiding channels.

Another object of my invention is to provide an operating mechanism for opposed valve disks in a gate valve to reduce valve leakage and resultant valve maintenance due to wear on the low pressure seat and valve disk normally caused by the sliding withdrawal of the low pressure valve disk from its seat.

With the above and other objects in view, the present invention consists of the combination and arrangement of parts hereinafter more fully described, illustrated in the accompanying drawing, and more particularly pointed out in the appended claims, it being understood that changes may be made in the form, size, proportion, and minor details of construction without departing from the spirit or sacrificing any of the advantages of the invention.

Figure 1:
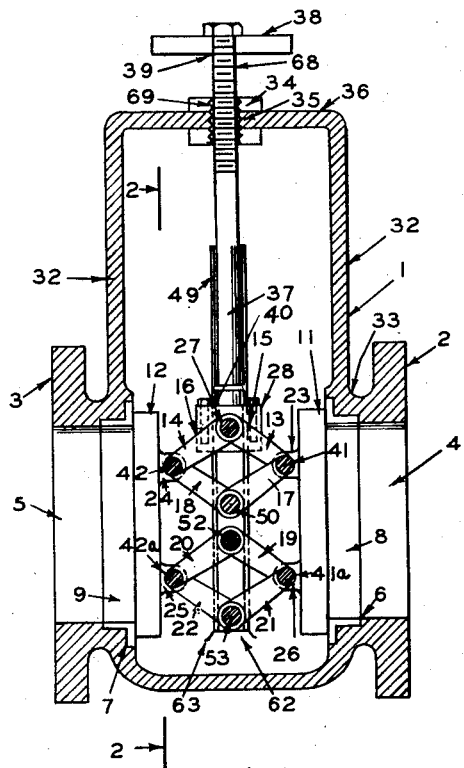
Fig. 1 is a cross sectional view taken on line 1—1 of Fig. 2.
Figure 2:
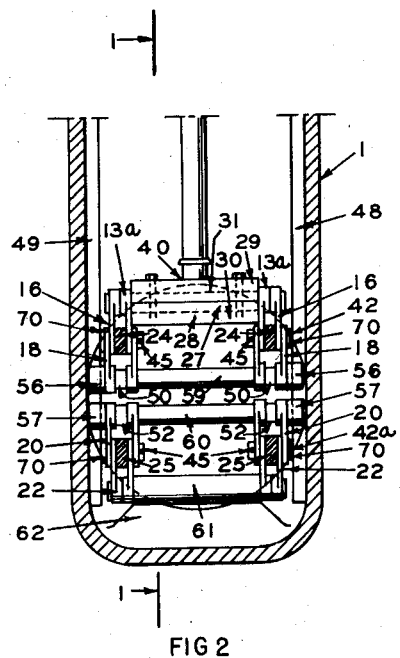
Fig. 2 is a cross sectional view of my novel valve taken on line 2—2 of Fig. 1.

Referring now to the drawing in more detail, Figs. 1 and 2 show a valve body 1 having aligned opposed flanges 2 and 3 for connecting the valve into a pipe line. The valve may be connected in a pipe line with the direction of flow either from opening 4 to opening 5 or vice versa as desired. Counterbores 6 and 7 are formed in the apertures 4 and 5 to receive inserts 8 and 9 forming valve seats. Valve disks 11 and 12 are connected to yokes 13 and 14 movable axially relative to each other. The yokes 13 and 14 are made up of laterally spaced upper parallelograms made up of links 15, 16, 17, and 18 and spaced lower parallelogram linkages made up of the links 19, 20, 21, and 22. The links 15 and 17 are connected to the apertured ears 23 on the valve disk 11 at the first corners of the upper parallelograms. The links 16 and 18 are connected to the apertured ears 24 on the valve disk 12 at second corners of the upper parallelograms and the links 20 and 22 are connected to the apertured ears 25 on the valve disk 12 at second corners of the lower parallelograms and the links 19 and 21 are connected to the apertured ears 26 on the valve disk 11 at first corners of the lower parallelograms. From an examination of Fig. 2, it will be noted that there are two each of links 15 through 22, one on either side of the respective ears 23, 24, 25, and 26. It will also be noted that links 15, 16, 17, and 18 and links 19, 20, 21, and 22 are disposed in parallelogram relation with the corners of the parallelogram connected to the members shown.

The links 15 and 16 are pivoted together at the ends thereof adjacent bracket 28 on pin 27 which extends through bracket 28. Bracket 28 is made up of upper part 29 and lower part 30 having an aperture 31 therethrough to accommodate the pin 27. The upper part of the valve has the walls 32 attached thereto at 33 forming a cap and stuffing box 34 is attached adjacent the aperture 35 in the upper wall 36 of the valve. The stuffing box 34 forms a seal against the escape of liquid between the stem 37 which has operating handle 38 attached to the upper end thereof at 39 and is attached at the lower end thereof to the bracket member 28 at 40.

The pin 41 forms a pivotal connection between the links 15 and 17 and the ear 23 and the pin 42 forms a pivotal connection between the links 16 and 18 with the ear 24. Pin 41a forms a pivotal connection between links 19 and 21 and ear 26 and pin 42a forms a pivotal connection between links 20 and 22 and the ears 25. Pins 41, 42, 41a, and 42a have enlarged heads 70 and are held in place by fastening pins 45. Opposed tapered vertical drive channels 48 and 49 are fixedly attached to the side of the valve.

The links 17 and 18 are pivotally connected by the pin 50 which pivotally engages the links and extends laterally transversely therebetween. The links 19 and 20 are connected together by the pin 52 and the ends of the links 21 and 22 are connected together by the pin 53 which extends through apertures in the ends of the links.

The outer ends of the pin 50 have slidable roller cap members 56 attached thereto and the outer ends of the pin 52 have the slidable roller cap members 57 attached thereto. These slidable cap members 56 and 57 are slidably guided in the opposed tapered channel guide members 48 and 49. Spacer members 59, 60, and 61 are concentrically disposed on the pins 50, 52, and 53, respectively, to hold the respective links in spaced relation. A stop member or seat 62 is attached to the bottom part of the valve 1 at 63 and adapted to engage the spacer member 61 to force the valve into a closed position.

The stem 37 has the upper end thereof threaded at 68 to threadably engage the female member 69 at the upper part of the valve. When the handle 38 is rotated in a counterclockwise direction, the stem 37 moves upwardly in the member 69 and the pins 41 and 42 are inclined to move toward each other because of the upward force on the pin 27 which causes links 15 and 16 to exert a force in togglelike manner on pins 41 and 42. This will cause the pins 41a, 42a, 41, and 42 to move toward each other and, consequently, the valve disks 11 and 12 will move toward each other in parallel relation, moving the valve disks out of engagement with the seats 8 and 9. Further movement of the stem 37 upward will move the valve disks 11 and 12 upward between the walls 32 into the cap to provide an unobstructed flow through the apertures 4 and 5.

When it is desired to close the valve, the handle 38 is rotated in a clockwise direction. The cap members 56 and 57 will thereby be forced to slide downwardly in the channels 48 and 49 and move the valve disks 11 and 12 downward into alignment with the apertures 4 and 5. When the spacer member 61 comes into engagement with the stop 62, the pins 27, 50, 52, and 53 will be forced toward each other which will cause the pins 41 and 41a to move in opposite directions from the movement of the pins 42 and 42a. This will move the disks 11 and 12 into engagement with the seats 8 and 9, respectively, to cause sealing engagement to stop the flow of fluid through the valve.

It will be seen from the foregoing description that all of the side and end thrusts in my novel operating mechanism are taken by the members 56 and 57 and the guide channels 48 and 49.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. A gate valve comprising a body having a cap thereon with a control member extending therethrough, an axially spaced inlet and outlet, a first and a second axially spaced valve member closing said inlet and said outlet, two laterally spaced upper and two laterally spaced lower parallelograms, said upper parallelograms being vertically spaced from said lower parallelograms, each of said parallelograms comprising four links pivotally connected together at a first corner, a second corner, a third corner, and a fourth corner by means of pins, said first and second corner of each said parallelogram constituting first opposite corners thereof and said third and fourth corner of each said parallelogram constituting second opposite corners thereof, said third corners of said upper parallelograms being connected to said control member, said first corner of each said parallelogram being connected to said first valve member, said second corner of each said parallelogram being connected to said second valve member, the said pin connecting said fourth corners of said upper parallelograms and said third corners of said lower parallelograms extending transversely outwardly from said parallelograms, and means on said body guiding the ends of said pins at said fourth corners of said upper parallelograms and said third corners of said lower parallelograms in a path parallel to the movement of said control member, said control member being movable vertically to move said valve members out of closing relation with said inlet and said outlet and into said cap, the fourth corners of said lower parallelograms engaging said body only when said valve members are in position to move into engagement with said inlet and said outlet and said lower parallelograms being free of attachment to said control member.

2. The gate valve recited in claim 1 wherein said first and second corners of each said parallelogram are connected to said valve members by means of apertured ears on said valve members and each said upper parallelogram and each said lower parallelogram are made up of two sets of parallelograms, one disposed on each side of each said ear.

3. The valve recited in claim 2 wherein said pins connect said first corners, said second corners, said third corners, and said fourth corners of said upper parallelograms and said first corners, said second corners, said third corners, and said fourth corners of said lower parallelograms.

4. The valve recited in claim 3 wherein said third corners of said upper parallelograms are connected to said control member by means of a bracket attached at an intermediate point thereto, said bracket having a transverse bore therethrough and the pins connecting said third corners of said upper parallelograms extending through said bore with one of said upper laterally spaced parallelograms disposed at each end of said bracket.

References Cited in the file of this patent

UNITED STATES PATENTS

| 465,776 | Clynick | Dec. 22, 1891 |
| 486,219 | Rowland | Nov. 15, 1892 |
| 869,525 | Schutte | Oct. 29, 1907 |
| 961,594 | Fischer | June 14, 1910 |
| 2,253,881 | Anderson | Aug. 26, 1941 |
| 2,626,774 | Palmer | Jan. 27, 1953 |

FOREIGN PATENTS

| 12,715 | Great Britain | June 28, 1893 |
| 4,154 | Great Britain | Dec. 24, 1897 |
| 530,442 | Germany | July 29, 1931 |